United States Patent
Bondu

(10) Patent No.: US 6,585,020 B2
(45) Date of Patent: Jul. 1, 2003

(54) CROWN REINFORCEMENT FOR A RADIAL TIRE

(75) Inventor: Lucien Bondu, La Roche Noire (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/139,734

(22) Filed: May 6, 2002

(65) Prior Publication Data

US 2002/0129885 A1 Sep. 19, 2002

Related U.S. Application Data

(63) Continuation of application No. PCT/EP00/09864, filed on Oct. 9, 2000.

(30) Foreign Application Priority Data

Nov. 8, 1999 (FR) .............................. 99 14093

(51) Int. Cl.[7] .............................. B60C 9/18; B60C 9/20
(52) U.S. Cl. ...................... 152/534; 152/526; 152/535
(58) Field of Search ............................... 152/534, 535, 152/526

(56) References Cited

U.S. PATENT DOCUMENTS 4,989,659 A  2/1991  Nakamura et al.
5,111,864 A  5/1992  Nakano et al.
5,435,369 A  7/1995  Yap et al.
5,660,654 A  8/1997  Miyazaki

FOREIGN PATENT DOCUMENTS

EP  0730987  9/1996
FR  1435804  3/1966

OTHER PUBLICATIONS

Patent Abstracts of Japan for JP63/125406, Kazuyoshi, "Pneumatic tire," May 28, 1988, The Yokohama Rubber Co. Ltd.

*Primary Examiner*—Adrienne C. Johnstone
(74) *Attorney, Agent, or Firm*—Baker Botts L.L.P.

(57) ABSTRACT

A tire includes a radial carcass reinforcement surmounted by a crown reinforcement formed of at least one working reinforcement having two plies of inextensible metallic reinforcement elements, parallel to each other within each ply and crossed from one ply to the next and forming with the circumferential direction angles $\alpha_1$ and $\alpha_2$ between 10° and 45,° and at least one protective ply. The axial widths $L_1$ and $L_2$ of the working plies and the axial width $L_3$ of the at least one protective ply are such that $L_3<L_2<L_1$. On either side of the equatorial plane XX' of the tire is at least one additional ply of inextensible metallic reinforcement elements located in the plane of the protective ply and oriented in the same direction as the elements of the least wide working ply, which forms with the circumferential direction an angle $\alpha_4$ greater in absolute value than the angle $\alpha_2$ of the elements of the radially outer working ply by at least 5°.

3 Claims, 1 Drawing Sheet

CROWN REINFORCEMENT FOR A RADIAL TIRE

CROSS REFERENCE TO RELATED APPLICATIONS

Figure 1:
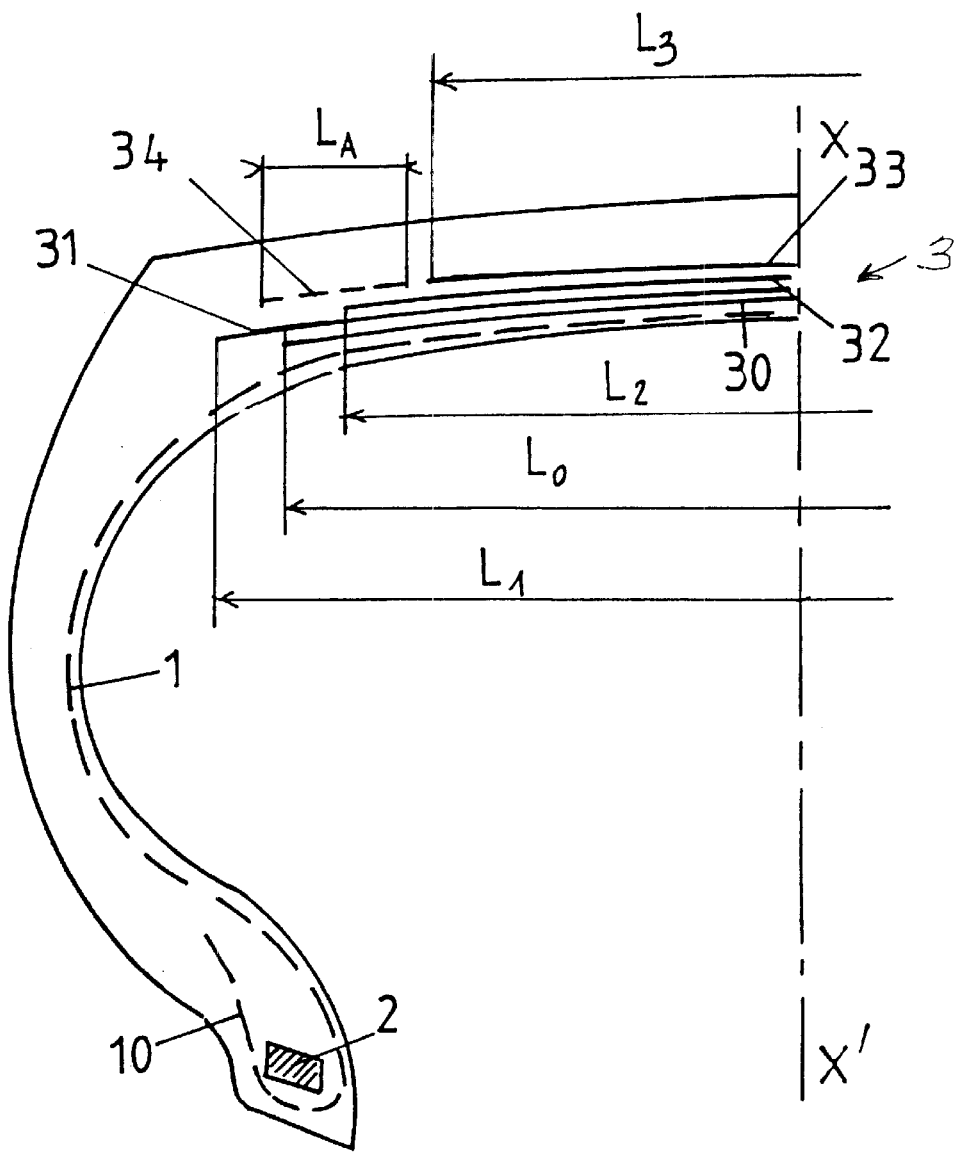

This application is a continuation of international application PCT/EP 00/09864 filed Oct. 9, 2000, published in French on May 17, 2001 as international publication WO 01/34413.

BACKGROUND OF THE INVENTION

1. Technical Field of the Invention

The present invention relates to a tire having a radial carcass reinforcement, which is intended to be fitted on heavy vehicles such as lorries, buses, tractors, trailers, etc., and relates more particularly to the crown reinforcement of such a tire.

2. The Related Art

Generally, the radial carcass reinforcement of the tire in question, which is formed of inextensible reinforcement elements made of metal or of aromatic polyamide, is surmounted radially by a crown reinforcement comprising a plurality of crown plies. In particular, the crown reinforcement includes a triangulation ply formed of metallic elements oriented relative to the circumferential direction by a large angle of between 45° and 90°. The triangulation ply is, in turn, surmounted by two working plies formed of inextensible metallic reinforcement elements that are parallel to each other within each ply and are crossed from one ply to the next, forming angles of between 10° and 45° with the circumferential direction. The working plies, which form the working reinforcement, are generally covered by at least one so-called protective ply, formed, in the majority of cases, of extensible metallic reinforcement elements, which are also referred to as elastic elements.

In the case of a tire for "heavy vehicles", a single protective ply is present. Its protective elements are generally oriented in the same direction and at the same angle in absolute value as those of the reinforcement elements of the radially outermost working ply, and generally less wide than the least wide, radially outermost working ply. Such crown reinforcements do not have sufficient endurance, in that, when the tires are running under high drift stresses, numerous breaks in the rubber appear and spread between the edges of the two working crown plies.

The commonly-owned French Patent 1 435 804, in order to avoid separation of the ends of the crown reinforcement when the tire is subject to high-speed travel, teaches arranging on either side of the reinforcement a narrow ply of cables forming an angle which may be between 40° and 70° with the cables of the carcass reinforcement. Such ply may be placed partially either above the crown reinforcement, or between the two working plies, or between the crown reinforcement and the carcass reinforcement. Any material desired may form the cables.

Japanese Application JP 63/125 406, in order to improve the uniformity, advocates the use of small reinforcement plies for the edges of the working reinforcement, such plies being formed of reinforcement elements made of inorganic fibre, such as carbon fibre or glass fibre, which are oriented parallel to the elements of the radially outer working ply.

U.S. Pat. No. 5,435,369, in order to guard against separations at the ends of the crown plies, teaches covering the ends of the two widest plies with additional small plies of reinforcement elements of material selected from among steel, aromatic polyamide, nylon, etc., and oriented relative to the circumferential direction by an angle which may be between 0° and 55°.

The progress made in terms of length of wear life (number of kilometers travelled) of the "heavy-vehicle" tires, and also the possibility of easy, economical later recapping, requires a crown reinforcement of improved resistance to separation between the edges of working plies.

SUMMARY OF THE INVENTION

In accordance with the invention, a tire is provided which comprises a radial carcass reinforcement radially surmounted by a crown reinforcement formed of at least one working reinforcement formed of two working plies, having axial widths $L_1$ and $L_2$, respectively, of inextensible metallic reinforcement elements, which elements are parallel to each other within each ply and are crossed from one ply to the next at angles $\alpha_1$ and $\alpha_2$ of between 10° and 45° with the circumferential direction, and of at least one ply, referred to as a protective ply, of axial width $L_3$, such that $L_3<L_2<L_1$. The reinforcement elements of the protective ply are inclined in the same direction as the reinforcement elements of the radially adjacent working ply. On either side of the equatorial plane of the tire, in the axial extension of the protective ply, is arranged an additional ply of inextensible metallic reinforcement elements of the same direction as that of the reinforcement elements of the radially outer working ply and forming with the circumferential direction an angle $\alpha_4$ greater in absolute value than the angle $\alpha_2$ of the elements of the working ply by at least 5°. The axial width $L_A$ of the additional ply is such that its axially outer end is distant from the equatorial plane by an amount greater than half the width of the least wide and radially outer working ply, and such that it does not cover the axial end of the widest and radially inner working ply. The axially outer end of the additional ply is located at a distance from the equatorial plane of the tire of between 42.5 and 47.5% of the axial width $L_1$ of the widest working ply which is radially to the outside.

As is known per se, the addition between the working reinforcement and the carcass reinforcement of what is called a triangulation ply may be advantageous, such triangulation ply being formed of inextensible metallic elements inclined greatly relative to the circumferential direction at an angle which may be between 45° and 90°, and having an axial width $L_0$ which is less than the width $L_1$ of the first working ply.

Preferably the angular difference $\alpha_4-\alpha_2$ is not greater than 20°. If the difference is less than 5°, the resistance to separation between working plies is not improved; if the difference is greater than 20°, it is possible to obtain the opposite effect to that desired, that is to say, to have an adverse effect upon the separation between edges of the working crown plies.

DESCRIPTION OF EXEMPLARY EMBODIMENT

The characteristics of the invention will be better understood with reference to the description of an exemplary embodiment illustrated by the appended drawing, comprising a single FIG. 1, which is a partial sectional view of a tire in accordance with the invention.

The tire P, of dimension 385/65 R 22.5X for example, comprises a radial carcass reinforcement composed of a single ply 1 of inextensible metal cables, that is to say, cables which have an elongation of at most 0.2% under a tensile force equal to 10% of the breaking load. The carcass reinforcement is anchored within each bead to a bead wire 2 to form an upturn 10. It is surmounted, radially to the outside, by a crown reinforcement 3 comprising radially from the inside to the outside:

- a first crown ply 30, referred to as a triangulation ply, formed of inextensible metal cables made of steel, which are oriented at an angle $\alpha_0$ (relative to the circumferential direction) equal in the case described to 50°;
- surmounting the ply 30, a first working crown ply 31, formed of inextensible metal cables made of steel, forming with the circumferential direction an angle $\alpha_1$ of 18°, the cables of the triangulation ply 30 and of the first working ply 31 being of the same direction;
- then a second working crown ply 32 formed of metal cables identical to those of the first ply 31, and forming with the circumferential direction an angle $\alpha_2$ opposed to the angle $\alpha_1$ and, in the case illustrated, equal in absolute value to the angle $\alpha_1$ of 18° (but possibly being different from the angle $\alpha_1$);
- lastly, an axially continuous ply 33 of so-called elastic metal cables made of steel, which are oriented relative to the circumferential direction by an angle $\alpha_3$ of the same direction as the angle $\alpha_2$, and equal in absolute value to the angle $\alpha_2$, this last ply 33 being a so-called protective ply, the so-called elastic metal cables being cables having a relative elongation of at least 4% at break; and
- on either side of the equatorial plane XX' and in the axial extension of the ply 33, at least one additional ply 34 of inextensible metal cables made of steel, which are parallel to each other within each ply and form with the circumferential direction an angle $\alpha_4$ of the same direction as the angles $\alpha_3$ and $\alpha_2$ formed by the cables respectively of the plies 32 and 33, but greater than such angles by an amount equal to 8°, i.e., $\alpha_4$ is equal to 26° in the example given.

The axial width $L_1$ of the first working ply 31 is equal, in the example given, to 0.78 times the maximum axial width $S_0$ of the center section of the carcass reinforcement 1, namely 280 mm, which, for a tire of conventional shape, is less than the width of the tread, which is equal, in the case in question, to 286 mm. The axial width $L_2$ of the second working ply 32 is less than the width $L_1$, and, in the example given, is equal to 212 mm. The axial width $L_0$ of the triangulation ply 30 is equal to 270 mm, which represents 0.75 $S_0$. The width $L_3$ of the protective ply 33 is less than the width $L_2$ of the least wide and radially adjacent working ply 32, and is equal in this example to 120 mm. As for the axial width of each additional ply 34, it is equal to 70 mm; each ply 34 being approximately centered on the axial end of the least wide, radially outer working ply 32.

Tires thus described were subjected to endurance testing running on vehicles and under high drift stresses. Whereas the control tires, which had a protective ply less wide than the second working ply and formed of reinforcement elements forming with the circumferential direction the same angle as the elements of that working ply, covered on average 6225 km, the tires of the invention travelled for 8660 km, which is a gain of about 39%, without said tires being adversely affected in terms of separations between the two working plies.

What is claimed is:

1. A tire, comprising a radial carcass reinforcement surmounted by a crown reinforcement formed of at least one working reinforcement formed of two working plies of inextensible metallic reinforcement elements, which working plies are parallel to each other within each ply and are crossed from one ply to the next, forming with the circumferential direction angles $\alpha_1$ and $\alpha_2$ of between 10° and 45°, the radially inner and the radially outer of said working plies having axial widths $L_1$ and $L_2$, respectively, and of at least one protective ply of axial width $L_3$ wherein $L_3 < L_2 < L_1$, said at least one protective ply being radially outward of said radially outer working ply and having reinforcement elements inclined in the same direction as the reinforcement elements of the radially adjacent outer working ply, wherein there is arranged on either side of the equatorial plane XX' of the tire, in the axial extension of the at least one protective ply, at least one additional ply of inextensible metallic reinforcement elements of the same direction as that of the reinforcement elements of the radially outer working ply and forming with the circumferential direction an angle $\alpha_4$ greater in absolute value than the angle $\alpha_2$ of the elements of the radially outer working ply by at least 5°, the axial width $L_A$ of each said additional ply being such that its axially outer end is distant from the equatorial plane XX' by an amount greater than half the width of the least wide and radially outer working ply, and such that the additional ply does not cover the axial end of the widest and radially inner working ply, said axially outer end of said at least one additional ply being located at a distance from the equatorial plane XX' of the tire of between 42.5% and 47.5% of the axial width $L_1$ of the radially inner working ply.

2. A tire according to claim 1, further comprising, between the working reinforcement and the carcass reinforcement, a triangulation ply, formed of inextensible metallic elements inclined greatly relative to the circumferential direction with an angle $\alpha_0$ of between 45° and 90°, and having an axial width $L_0$ which is less than the width $L_1$ of the radially inner working ply.

3. A tire according to claim 1, wherein the difference $\alpha_4 - \alpha_2$ between the angle of the reinforcement elements of each additional ply and the angle of the reinforcement elements of the radially outer working ply is not greater than 20°.

* * * * *

UNITED STATES PATENT AND TRADEMARK OFFICE
CERTIFICATE OF CORRECTION

PATENT NO. : 6,585,020 B2  Page 1 of 1
DATED : July 1, 2003
INVENTOR(S) : Lucien Bondu It is certified that error appears in the above-identified patent and that said Letters Patent is hereby corrected as shown below:

<u>Title page,</u>
Item [57], ABSTRACT,
Line 7, "45,º" should read -- 45º, --
Line 10, "XX'" should read -- X–X' --

<u>Column 1,</u>
Line 47, "commonly-owned" should read -- commonly owned --

<u>Column 2,</u>
Line 39, "outside." should read -- inside. --

Signed and Sealed this

Thirteenth Day of January, 2004

JON W. DUDAS
*Acting Director of the United States Patent and Trademark Office*